No. 625,400. Patented May 23, 1899.
J. LAMBERT.
MILL FOR MAKING NUT BUTTER.
(Application filed Dec. 28, 1898.)
(No Model.)
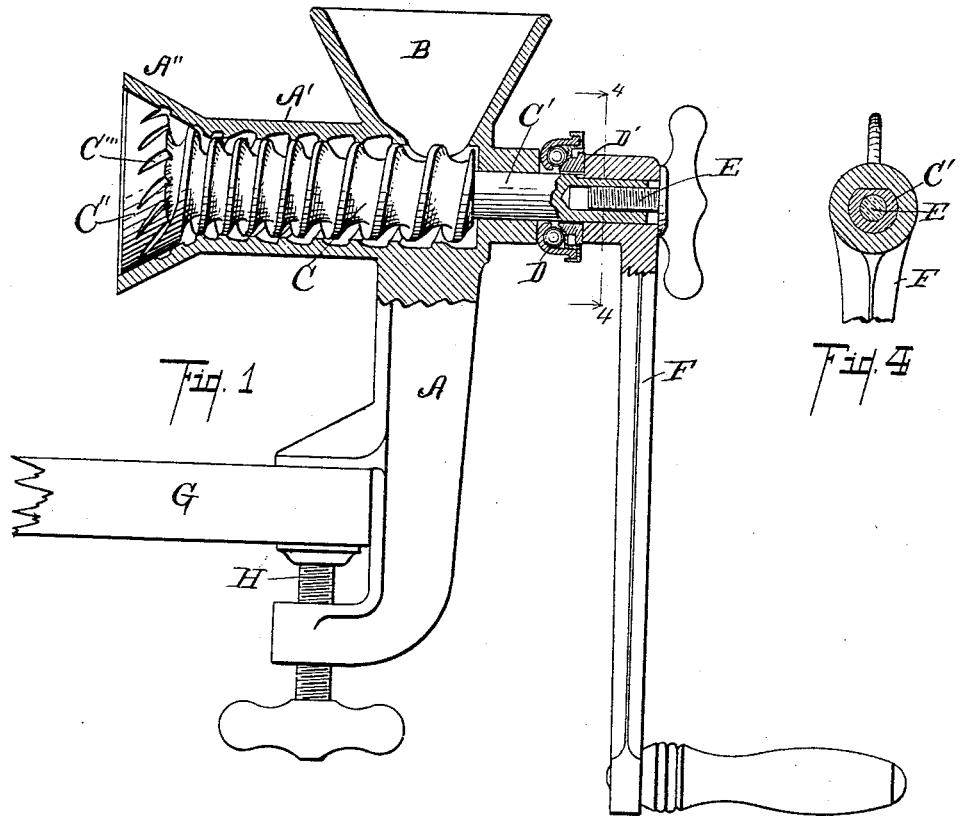
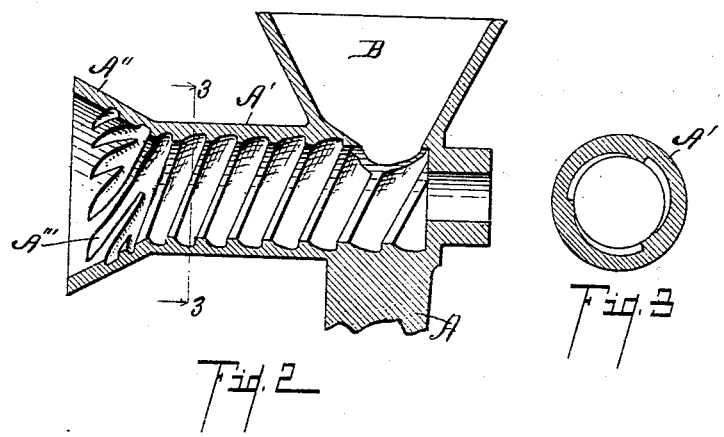
Witnesses:
Otis A. Earl
Lela M. Brown
Inventor,
Joseph Lambert
By Fred L. Chappell
Att'y.

UNITED STATES PATENT OFFICE.

JOSEPH LAMBERT, OF BATTLE CREEK, MICHIGAN.

MILL FOR MAKING NUT-BUTTER.

SPECIFICATION forming part of Letters Patent No. 625,400, dated May 23, 1899.

Application filed December 28, 1898. Serial No. 700,556. (No model.)

*To all whom it may concern:*

Be it known that I, JOSEPH LAMBERT, a citizen of the United States, residing at the city of Battle Creek, in the county of Calhoun and State of Michigan, have invented certain new and useful Improvements in Mills for Making Nut-Butter, of which the following is a specification.

This invention relates to improvements in mills for grinding nuts into butter. It is more particularly and especially adapted for use in grinding roasted peanuts, although it is adapted to grinding almonds or any other kind of nuts and reducing them to a smooth oily mass called "nut-butter." In the operation of a device of this kind it is necessary to force the ground kernels of the nuts through smooth rubbing-surfaces to thoroughly break the same and reduce them to the desired pasty condition. To do this, it is necessary to provide a machine which, in addition to its grinding action, has a positive forcing movement to it to crowd the kernels along as they are being ground and cut up.

It is the object of my invention to provide a simple and efficient means of grinding the nut-meats into a pasty mass or butter, and this I accomplish by the devices and means described in this specification. The invention is definitely pointed out in the claims. The structure accomplishing the result is fully illustrated in the accompanying drawings, forming a part of this specification, in which—

Figure 1 presents a detail view of my improved grinder, the upper portion of the casing being cut in longitudinal sections, the grinder or screw being left in full lines. Fig. 2 is a detail sectional view of the casing with the grinding screw or head removed. Fig. 3 is a detail sectional view through the casing, taken on a line corresponding to line 3 3 of Fig. 2. Fig. 4 is a transverse detail sectional view on line 4 4 of Fig. 1, showing the arrangement of the crank and method of attaching and adjusting the same.

In the drawings all of the sectional views are taken looking in the direction of the little arrows at the ends of the section-lines, and similar letters of reference refer to similar parts throughout the several views.

Referring to the lettered parts of the drawings, A represents the standard, which is provided with a suitable thumb-screw and clamp for attaching the machine to a table or bench, as desired. The casing is made up of two parts—a cylindrical portion A' and a conical portion A''—and a hopper B leads into this casing from the top and toward its rear end. The interior of the casing is provided with spiral grooves, there being three parallel sets of grooves, which are right-handed. The rear portion of each groove—that is, the front portion of each rib—is formed with a square shoulder to prevent the easy return of any material within the casing. The grinding-head is provided with a spiral thread of opposite rotation to that in the casing. The thread is made coarse at the rear end, where the kernels are delivered into it from the hopper, and grows finer as it goes forward, thus increasing its force. The front of the grinding-head is expanded and is conical in form and fits close within the casing. In the casing a number of grooves A''' project outwardly beyond the spirals to in practice within one-fourth of an inch of the end. Corresponding grooves are on the conical portion of the grinder-head. This grinder has a shank C' extending therefrom, on which a suitable crank F is placed to rotate the same. The shank is flattened at one side and an aperture in the crank is made to correspond. A thumb-screw E fits into a thread cut into the end of the shank and serves to draw the crank tight into place. Between the crank and the casing is inserted a suitable ball-race carrying antifriction-balls D. The cone D' of the race is a loose fit on the shaft, so that when the crank is screwed up it adjusts itself readily and permits the grinder to be held into the case with a strong pressure, thus insuring a close fit of the conical portions C'' thereof within the enlarged portion A'' of the casing. I desire to state in this connection that I have provided what I consider the best means for attaching the crank and of applying pressure thereto in such a manner as to overcome the friction and still hold the conical portion of the head tight enough in its seat to secure the complete grinding of the nut forced through the same. The grinder in its bearing-surfaces is fitted into the casing by ground joint, and consequently fits very close in order to secure the desired result. Nut-kernels are put into the hopper B, and by rotating the crank they are forced, by the oppositely-situated threads of the screw and the casing, with a strong pressure toward the conical end of the grinder and are cut and broken between the ribs forming the threads. These ribs, being square-shouldered toward the enlarged head, prevent the return of the meats, and as the crank is rotated very heavy pressure is brought to bear against the meats, forcing them into the grooves A''' in the casing and C''' in the grinder-head, which, it will be noted, are inclined, and as the force continues the oily pasty mass is forced out through between the close-fitting surfaces C'' and A'' and reduced to a butter or pasty mass in no wise resembling meal or the kernels of the nuts from which it is made.

This nut-butter has been found to be available for a great variety of uses, and this machine enables its easy and practical preparation, so that the user can have it absolutely freshly prepared before it has become stale in any way, as the material needs to be packed with considerable care after it is made if it is intended to keep it for any length of time.

I desire to state that I find in my experience it is a practical necessity to secure a quick-operating machine to provide it with the grooves or notches C''' and A''' and that the ball-bearing is also very desirable to secure the highest tension in the machine and yet allow it to operate easily. I am aware that machines have been made and used without either of these features, though they are very difficult to operate and unsatisfactory.

This structure is adapted for use as a power-machine by substituting the usual pulley or gear in place of the crank F, and I am aware that it is not necessary to make the casing all of a single piece, this being, however, the preferred manner of constructing the same.

Having thus described my invention, what I claim as new, and desire to secure by Letters Patent, is—

1. The combination of a suitable casing A' having an enlarged projecting funnel-shaped portion A'' smooth at the front which is provided with suitable spiral grooves with a hopper B to the rear thereof; and a grinder-head C with an enlarged conical portion C'' containing a spiral thread and notches C''' and adapted to fit tightly the outer portion of the casing A''; and the screw portion fitting the corresponding part of the casing sufficiently close to coact therewith, the said grinder having a shank C' projecting through the casing on which is adjustably secured a crank F for putting tension upon the grinder and its casing.

2. The combination, in a grinding-mill for grinding nuts or similar material, of an outer casing containing spiral grooves with a smooth portion at the front and with a hopper to feed the same at the rear, and a screw within the same, having a smooth portion adapted to fit the smooth portion of the outer casing, the said outer casing and grinder being provided with screw-threads as aforesaid, fitting each other sufficiently close to coact with each other, and with additional angular notches to receive the kernels and force them through the smooth portion, as specified.

In witness whereof I have hereunto set my hand and seal in the presence of two witnesses.

JOSEPH LAMBERT. [L. S.]

Witnesses:
SAMUEL J. PICKLES,
HERBERT O. EVANS.